United States Patent Office 3,573,932
Patented Apr. 6, 1971

3,573,932
HYDRATED FREEZE-DRIED CONFECTIONS
Maurie Laskin, Milwaukee, Wis., assignor to W. R. Grace
& Co., New York, N.Y.
No Drawing. Filed Mar. 3, 1967, Ser. No. 620,278
The portion of the term of the patent subsequent to
Aug. 6, 1985, has been disclaimed
Int. Cl. A23g 3/00
U.S. Cl. 99—134       10 Claims

ABSTRACT OF THE DISCLOSURE

Freeze-dried, substantially dry confectionary food products to which a chewy consistency has been imparted by partially rehydrating the same to a moisture content of from about 2 to about 10 percent, by weight; and a method for making such products by freeze drying to a substantially dry condition and then controllably rehydrating the same.

---

This application is related to my prior co-pending United States patent applications Ser. No. 465,835 filed June 18, 1965 and now U.S. Pat. 3,483,000; and Ser. No. 464,832 filed June 17, 1965, and now U.S. Pat. 3,464,834; and Ser. No. 464,867 filed June 17, 1965, and now abandoned in favor of United States applications Ser. No. 619,584 filed Mar. 1, 1967, and now U.S. Pat. 3,396,041, Ser. No. 684,613 filed Nov. 21, 1967, and now U.S. Pat. 3,419,402 and Ser. No. 684,626 also filed Nov. 21, 1967, and now U.S. Pat. 3,472,663; which applications were, in turn, related to my then copending application Ser. No. 324,240 filed Nov. 18, 1963, and now abandoned, the disclosures of which prior applications are incorporated herein by reference.

This invention relates to novel confectionary food products having a chewy consistency and particularly adapted for use as the center piece in coated cookie and candy items. In particular the invention relates to substantially dry, cellular, freeze-dried confectionery food items which have been partially and controllably rehydrated so as to have a chewy consistency. The invention also relates to a method of preparing these novel products by first freeze-drying to a low moisture content below about 2 percent by weight in accordance with the processes disclosed and claimed in the aforementioned prior related applications, and then controllably and partially rehydrating to a moisture content in the range of from about 2 to about 10 percent by weight.

In the earlier related applications referred to above there are disclosed a wide variety of substantially dry, cellular, freeze dried confectionary food products such as freeze dried frozen ice milk confections (e.g., ice cream, ice milk, soft ice, high fat ices, sherbets, frozen custards and the like) U.S. Pat. 3,464,834; gelled gelatin and gelatin-base, desserts U.S. Pat. 3,483,000, fruits, fruit purees, berries, berry purees, fresh coconut, cake, pie, peanut butter admixed with at least about 0.2 part by weight of water per part of peanut butter—U.S. Pat. 3,396,041; toffee, honey, candy, jam, marmalade, jellies, puddings and cake or pie fillings containing at least one of the group consisting of pectin, starch and gel-forming natural gums as gelling agent—U.S. Pat. 3,419,402, sour-cream-fruit mixture, sour-cream berry mixtures, U.S. Pat. 3,472,663, and other like products. These applications also disclose and claim a process for preparing such products which comprises first solidly freezing the product at atmospheric pressure to form a hard solid monolithic shape and then drying to a low moisture content by heating at reduced pressures of less than about 1.5 millimeters of mercury (absolute) while controlling the rate of heating so as to prevent thawing and maintain the frozen portion of the product in the solid frozen state until dehydration is essentially complete. The resultant products are cellular, crumbly, friable items typically having a moisture content of about 1½ weight percent or below.

It has now been found that new and useful confectionary products having a chewy consistency can be obtained by partially and controllably rehydrating the low moisture content products disclosed in the prior related applications to a moisture content in the range of from about 2 to about 10 percent by weight.

It is essential for the purposes of the present invention to first prepare a substantially dry, cellular, freeze-dried product in accordance with the teachings of the prior related applications and then to partially and controllably rehydrate. Direct dehydration to the moisture content of the products of this invention does not provide the same result. Thus, for example, if dehydration is discontinued at a moisture level of, e.g., 5 percent, the resultant product will have a non-uniform texture and body, "melt-down" will occur, and a poor quality product having large voids and/or a hollow center will typically be the result. In contrast, products prepared in accordance with this invention will be substantially uniform in body and texture.

The partial, controlled rehydration contemplated in the practice of the present invention can be accomplished in any suitable manner. In the presently preferred embodiment of this invention moisture vapor in suitable amounts is added to the gas stream (typically nitrogen or air) which is fed into the freeze-drying apparatus when the evacuated drying chamber is brought back to atmospheric pressure upon completion of the desired drying cycle.

The amount of rehydration which should be used in the practice of the invention will depend upon the particular product being processed and the degree of chewiness desired in the end product. As a general rule the dry product should be rehydrated to a moisture content of not less than about 2 percent by weight in order to obtain a noticeable degree of chewiness. Rehydration to a higher moisture content will generally provide a greater degree of chewiness. As a practical maximum, rehydration to a moisture content of not more than about 10 percent by weight is presently preferred, since final moisture content significantly greater than this will usually result in unfavorable decreases in storage stability.

As previously stated the presently preferred method for accomplishing the rehydration is by addition of moisture vapor to the gas stream used in bringing the pressure of the evacuated freeze-drying chamber back to atmospheric pressure. The moisture vapor may be added in any suitable predetermined amount up to the amount which can be retained in the flowing gas stream. As will be understood these maximum amounts will depend upon such factors as the temperature, velocity, total pressure and constitution of the gas stream. Typically about 2 to about 25 percent by weight of moisture is added to the re-pressurizing gas stream. The flow of moisture-containing gas into the chamber is continued until the desired amount of rehydration of the product is obtained. This will, in typical cases, involve a time period of from about 15 minutes or so up to about 10 hours. In general, the speed of rehydration increases with decreased thickness of the product being rehydrated.

If desired, volatile aromas or flavorants can also be incorporated in the repressurizing moisture-containing gas stream to impart flavor to the chewy end product. In a similar fashion colorants can also be incorporated if desired, either dispersed in the gas or in solution with the water in the gas. This method of flavoring and/or coloring, per se, is disclosed and claimed in copending, co-assigned application Ser. No. 643,826, filed June 6, 1967, and does not, by itself, form a part of the present invention.

The chewy products of this invention are eminently suited for use as center pieces in chocolate coated candy bars and like items. They may also be coated with other edible coating materials which will protect them from atmospheric moisture; or they may be stored in sealed moisture protective containers for later consumption, as such.

The invention will be further understood from the following examples illustrating certain presently preferred embodiments thereof. It is to be understood that, while the specific examples show only the processing of several frozen ice milk confections, the invention is of general applicability to any of the various confectionary food products disclosed in the prior related applications referred to hereinabove.

EXAMPLE 1

Vanilla ice cream of 10 percent butterfat content was cut into monolithic slabs, one-half inch in thickness. The slabs were preliminarily cooled at atmospheric pressure to −5° Fahrenheit. The product was then placed in a freeze-drier chamber [Freeze-Dry Pilot — Model UPFD–X, Vacudyne Corp.] and the pressure was reduced, over a period of one hour and fifteen minutes, to 0.41 millimeters mercury (absolute). During this time the product temperature dropped to about −22° to −25° Fahrenheit due to sublimation cooling. The heat in the drier platens was then applied according to the following schedule of chamber pressure, platen temperature and time for each sequence.

| Platen temperature, degrees Fahrenheit | Pressure millimeters of mercury (absolute) | Time |
|---|---|---|
| 150 | 0.68 | 50 minutes. |
| 125 | 0.49 | 30 minutes. |
| 100 | 0.45–0.5 | 15 hours 40 minutes. |

After a total treatment time of 18 hours 15 minutes, controlled partial rehydration was initiated by passing a nitrogen stream containing 10 weight percent water through the chamber for 1 hour. The product was removed as monolithic slabs of about 8 percent moisture content. While the product was visually dry and not moist to the touch, it could be easily compressed by finger pressure without breaking, and when chewed has the consistency of a soft caramel. The product is readily stored in hermetically sealed, moisture-proof containers without refrigeration.

Several of the partially rehydrated, chewy product pieces were coated with chocolate to make a chewy center candy bar or piece type of confection. Other pieces were coated with caramel and then with a layer of chocolate to produce like candy products. In each case an excellent end product with very good storage stability was obtained, in which the coating of chocolate and/or caramel acts as a moisture vapor barrier surrounding the chewy core.

In order to provide a comparison, the identical procedure was carried out except that the controlled partial rehydration was omitted. The product recovered had a moisture content of about one percent and was readily friable to a dry powder When pressed between the fingers, it crumbled with a crackling noise, not unlike a well-known commercial dry, puffed, whole grain cereal product. It had the general appearance of an after-dinner mint, and when eaten, crumbled in the mouth upon mastication.

EXAMPLE 2

A frozen ice milk confection, popularly known as a frozen custard, having a butterfat content of about 4½ percent, was treated by the procedure of Example 1, except that after a freeze drying treatment time of nineteen hours and forty-five minutes, a stream of air containing 15 percent moisture was passed over the product for about 1 hour. A chewy, visually dry product having a moisture content of about 8 to 10 percent was recovered.

EXAMPLE 3

A fronzen ice milk confection, popularly known as pineapple sherbet was obtained on the open market from the local branch of a well known nationwide chain grocery store and was cut into monolithic slabs about 1½ x 2 inches by ⅜ inch thick, and treated by the procedure of Example 1, except that after a freeze drying treatment of about 15 hours, a stream of air containing 10 percent moisture was passed over the slabs for about 2 hours. The recovered product slabs had a moisture content between 4 and 6 percent. These had a good, chewy body and excellent taste, with a good sharp characteristic flavor. They were judged to be eminently suited for use as fruit flavored centers in candy enrobed with chocolate or other candy coating.

EXAMPLE 4

A frozen ice milk confection of the mellorine type was prepared using the following formulation:

IMITATION ICE CREAM FORMULATION

| Ingredient: | Parts by weight |
|---|---|
| Corn oil | 1100 |
| Powdered skim milk | 1337 |
| Cane sugar | 1100 |
| Powdered corn syrup sugars (Frodex) | 660 |
| Stabilizer | 33 |
| Water | 6770 |

Flavor (vanilla) 4 ounces.

After freeze drying as in Example 1, a nitrogen stream containing 20 percent moisture was passed over the slabs for 1 hour. The chewy product had a moisture content of about 8 percent. It was well suited for use as a candy center piece, similarly as the products of the preceding examples.

What is claimed is:

1. Method for producing a confectionary food product comprising cooling at about atmospheric pressure a monolithic shape of a food product selected from the group consisting of:

(a) admixtures of peanut butter with at least about 0.2 parts by weight of water per part of peanut butter;
(b) jellies, puddings and cake or pie fillings containing at least one of the group consisting of pectin, starch and gel-forming natural gums as gelling agent;
(c) an already frozen ice milk confection of cellular character;
(d) sour cream-fruit or sour cream-berry mixtures; and
(e) a gelled gelatin dessert product to a temperature at which the said monolithic shape is a hard-frozen solid, dehydrating said hard-frozen solid shape to a moisture content of less than about 1½ percent by weight by applying heat thereto at reduced pressures of less than about 1.5 millimeters of mercury (absolute) while controlling the rate of heat application so as to maintain the hard-frozen solid portion of said product in the solid frozen state until dehydration is complete and then converting the resulting substantially dry, cellular, freeze-dried piece of said food product to a chewy confectionary product by the method step consisting of partially rehydrating said piece to a final moisture content in the range of from about 2 to about 10 percent by weight to produce a chewy product piece substantially uniform in body and texture.

2. Method of claim 1 wherein rehydration is accomplished by contacting the substantially dry product with a moisture containing gas until the desired final moisture content is reached.

3. Method of claim 2 wherein said confectionary food product is a frozen ice milk confection.

4. Method of claim 3 wherein said frozen ice milk confection is ice cream.

5. Method of claim 2 wherein said confectionary food product is a cellular peanut butter containing product.

6. Method of claim 2 in which the product is also flavored by adding a volatile flavoring agent to said gas stream.

7. As an article of manufacture, a chewy confectionary food product produced in accordance with the method of claim 1.

8. Article of manufacture as defined in claim 7 having an enveloping candy coating.

9. Article of claim 8 wherein said candy coating is chocolate.

10. Article of claim 9 wherein said product is ice cream.

References Cited

UNITED STATES PATENTS

| | | | |
|---|---|---|---|
| 1,127,114 | 2/1915 | Thompson | 99—137 |
| 2,917,746 | 12/1959 | La Rocca et al. | 99—125 |
| 3,046,145 | 7/1962 | Deobald et al. | 99—207 |
| 3,139,345 | 6/1964 | Nury | 99—104 |
| 3,396,041 | 8/1968 | Laskin | 99—204 |
| 3,419,402 | 12/1968 | Laskin | 99—199 |
| 3,385,715 | 5/1968 | Ishler et al. | 99—209X |
| 3,464,834 | 9/1969 | Laskin | 99—199 |
| 3,472,663 | 10/1969 | Laskin | 99—134 |
| 3,483,000 | 12/1969 | Laskin | 99—134 |

OTHER REFERENCES

Smith, Freeze-Drying of Foodstuffs, Baker's Review, (London), v. 78, pp. 573–574, April 1961.

JOSEPH M. GOLIAN, Primary Examiner

U.S. Cl. X.R.

99—92, 125, 128, 130, 136, 139, 199, 204